United States Patent [19]

Liang et al.

[11] 4,408,501
[45] Oct. 11, 1983

[54] MULTIPLE RATIO TORQUE CONVERTER TRANSMISSION WITH MAIN TRANSMISSION PLANETARY GEARING AND A COMPOUND TORQUE SPLITTER PLANETARY GEAR UNIT BETWEEN THE CONVERTER AND THE MULTIPLE RATIO GEARING

[75] Inventors: Po-lung Liang, Livonia; Alan R. Fisher, Dearborn, both of Mich.

[73] Assignee: Ford Motor Company, Dearborn, Mich.

[21] Appl. No.: 265,746

[22] Filed: May 21, 1981

[51] Int. Cl.³ ............................................. F16H 47/08
[52] U.S. Cl. ...................................................... 74/688
[58] Field of Search .......................... 74/677, 687, 688

[56] References Cited

U.S. PATENT DOCUMENTS

| | | | |
|---|---|---|---|
| 2,333,681 | 11/1943 | Schneider | 74/688 |
| 3,023,637 | 3/1962 | De Lorean | 74/688 |
| 3,296,891 | 1/1967 | Tuck | 74/688 X |
| 4,014,223 | 3/1977 | Pierce, Jr. | 74/688 |

Primary Examiner—Lawrence J. Staab
Assistant Examiner—Frank H. McKenzie, Jr.
Attorney, Agent, or Firm—Donald J. Harrington; Keith L. Zerschling

[57] ABSTRACT

A hydrokinetic torque converter transmission for an automotive vehicle driveline comprising multiple ratio gearing having two input torque elements and an output torque element and a compound planetary torque splitter gear unit in the converter including a compound planet carrier connected drivably to the converter turbine and adapted to be connected to one input torque element of the gearing, the ring gear of the torque splitter gear unit being adapted to be connected to a second input torque element of the gearing.

6 Claims, 4 Drawing Figures

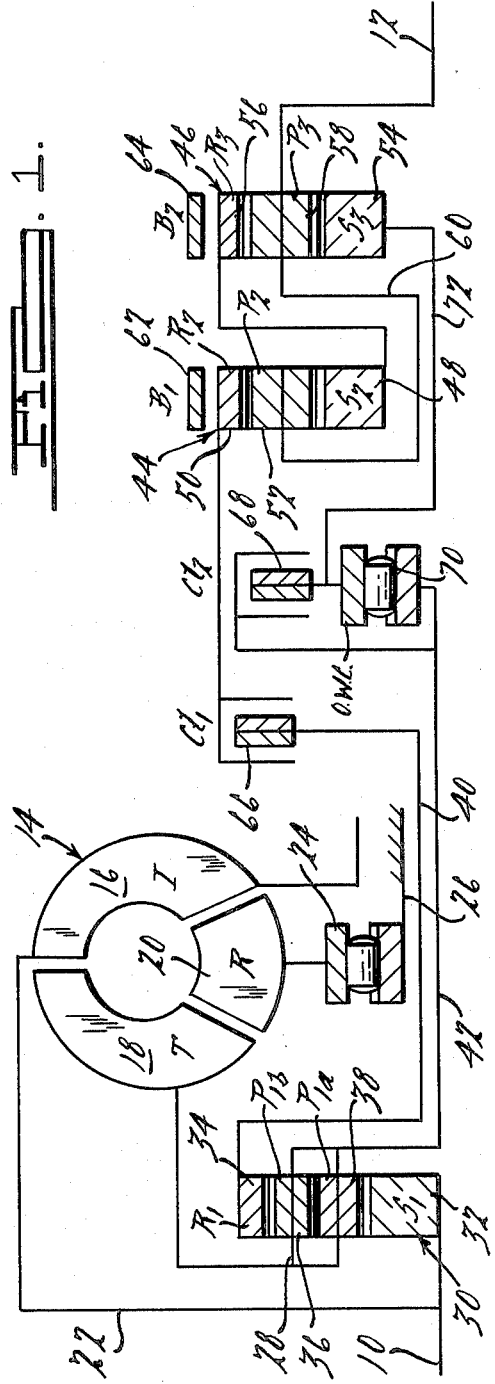

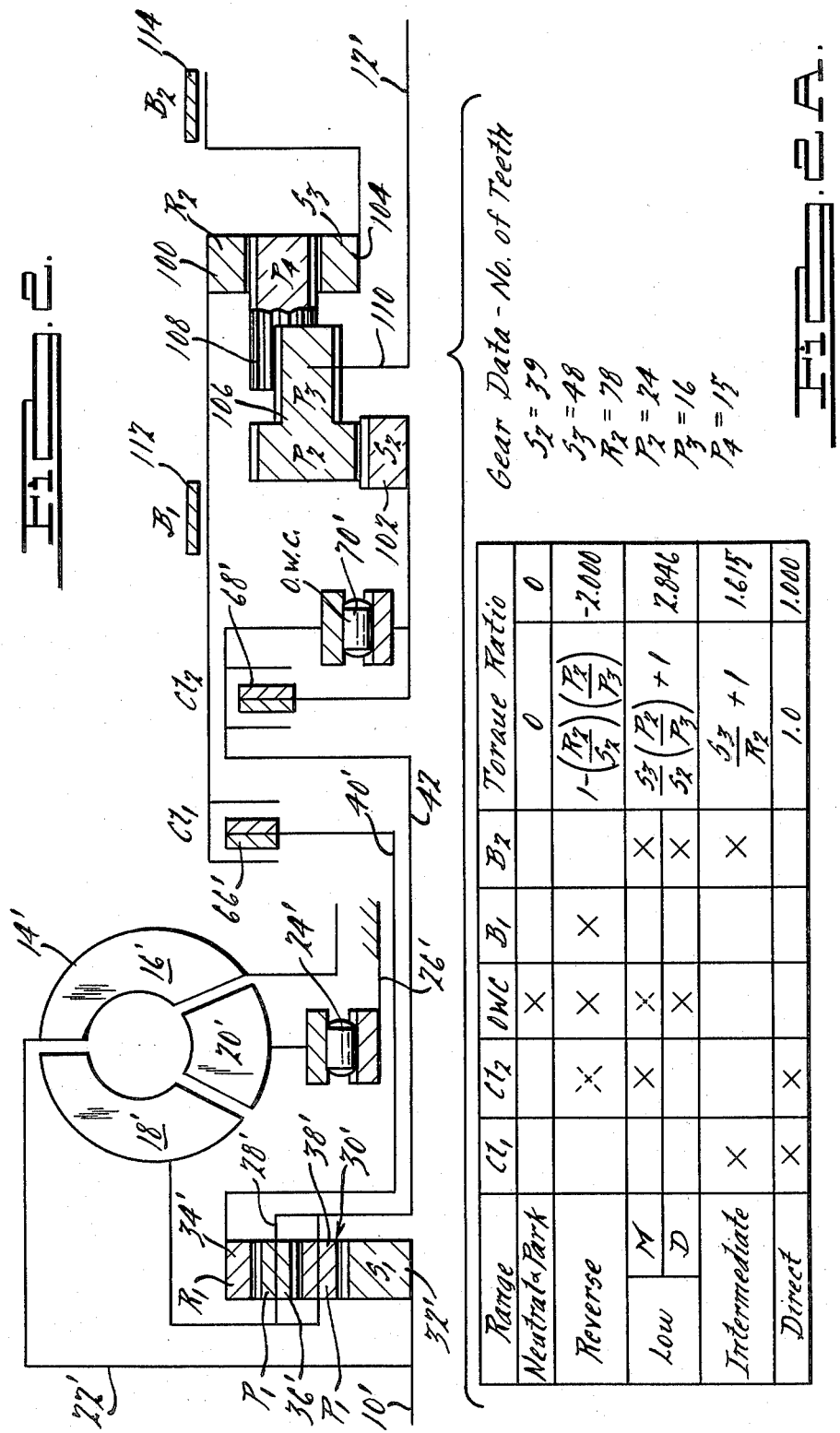

MULTIPLE RATIO TORQUE CONVERTER TRANSMISSION WITH MAIN TRANSMISSION PLANETARY GEARING AND A COMPOUND TORQUE SPLITTER PLANETARY GEAR UNIT BETWEEN THE CONVERTER AND THE MULTIPLE RATIO GEARING

GENERAL DESCRIPTION OF THE INVENTION

Our invention comprises improvements in compound planetary gear transmission and torque converter arrangements of the kind shown in U.S. Pat. No. 4,014,223 wherein a hydrokinetic torque converter and a simple planetary split torque gear unit located in the converter are arranged to provide dual torque input paths from an engine to each of two torque input gear elements of the multiple ratio gearing.

When the multiple ratio gearing is conditioned for a first drive mode characterized by high torque multiplication, the split torque gear unit is inactive; and all of the torque is distributed hydrokinetically through the torque converter to a first of the torque input gear elements of the multiple ratio gearing. During operation of the transmission mechanism in a second drive mode, part of the torque is distributed hydrokinetically and the balance is distributed mechanically. The ratio of the magnitude of the torque delivered mechanically is about 1 to 2. During operation in a third or high speed drive mode, the transmission is adapted to deliver most of its torque mechanically. Approximately 7 percent of the torque is distributed hydrokinetically. This split torque arrangement is adapted to reduce the hydrokinetic losses in the torque converter and thereby improve the overall operating efficiency of the driveline.

In our improved transmission mechanism we have provided a split torque delivery using a compound torque splitter gear unit having a compound carrier and two sets of planet pinions wherein the common carrier is connected drivably to the converter turbine. The carrier also is adapted to be clutched to a first torque input element of the multiple ratio gearing. The ring gear of the torque splitter gear unit is adapted to be clutched to a second torque input element of the multiple ratio gearing. The common carrier to which the turbine is connected is adapted to deliver torque to a central torque transfer shaft thereby reducing the overall size of the transmission and the total weight without an accompanying torque capacity reduction.

BRIEF DESCRIPTION OF THE DRAWINGS

FIG. 1 shows in schematic form a first embodiment of our invention which includes a compound planetary torque splitter unit and a main gear system comprising two simple planetary gear sets.

FIG. 1A is a chart showing a clutch-and-brake engagement and release pattern for the transmission schematically shown in FIG. 1.

FIG. 2 is a schematic drawing of a second embodiment of our invention.

FIG. 2A is a chart that shows a clutch-and-brake engagement and release pattern for the transmission shown schematically in FIG. 2.

PARTICULAR DESCRIPTION OF THE INVENTION

Numeral 10 designates a crankshaft of an internal combustion engine and numeral 12 designates a torque output shaft adapted to be connected to vehicle traction wheels through a differential and axle assembly.

Numeral 14 designates generally a hydrokinetic torque converter that includes a bladed impeller 16, a bladed turbine 18 and a bladed stator or reactor 20. The impeller, the turbine and the stator are arranged in toroidal fluid-flow relationship in the usual fashion; and the impeller is connected drivably to the crankshaft 10 through a driveplate 22.

An overrunning brake 24 is supported by sleeve shaft 26. Its outer race is connected to the bladed stator 20, thus preventing rotation of the stator in a direction opposite to the direction of rotation of the impeller. During operation of the converter in the torque multiplication range, the turbine 18 is connected to a compound carrier 28 for a compound split torque gear unit 30. Gear unit 30 includes, in addition to the carrier 28, a sun gear 32, a ring 34 and a pair of planet gears 36 and 38, each planet gear being journalled on the carrier 28 with the gears 36 meshing with gears 38.

Sleeve shaft 40 is connected to the ring gear 34, and the carrier 28 is connected to a centrally situated torque transfer shaft 42.

The main gearing of the transmission comprises two simple planetary gear units 44 and 46. Gear unit 44 comprises sun gear 48, ring gear 50 and planet gears 52. Gear unit 46 comprises sun gear 54, ring gear 56 and planet gears 58. Planet gears 52 and 58 are journalled on a common carrier 60 which is connected to the torque output shaft 12. Ring gear 50 forms a part of or defines a brake drum about which is positioned brake band 62. A corresponding brake band 64 surrounds ring gear 56. When either brake band 62 or 64 is applied, the respective ring gear is anchored.

Ring gear 50 is adapted to be connected to sleeve shaft 40 through selectively engageable friction clutch 66. Selectively engageable friction clutch 68 is adapted to be connected drivably to the central shaft 72 to the sun gear 54. An overrunning clutch 70 is situated in parallel relationship with respect to the friction clutch 68, and it is adapted to deliver torque from the shaft 42 to the sun gear shaft 72, the latter being connected to the sun gear 54.

In FIG. 1A the clutch-and-brake engagement and release pattern for the various drive ranges is apparent. To establish first drive range, clutch 68 and brake band 64 are applied and the other clutch control devices are released. If continuous operation in the low drive range is not desired, clutch 68 can be released; and torque then is transferred to the sun gear 54 through the overrunning clutch 70.

To effect an automatic ratio change to the intermediate or second speed ratio, clutch 66 is applied as brake band 64 remains applied. The torque on the ring gear 34 then is distributed to the ring gear 50. In this drive range the torque distributed directly to the sun gear 32 of the split torque unit complements the hydrokinetic turbine torque delivered to the carrier 28 so that the resulting torque on the ring gear 34 is distributed through the sleeve shaft 40 and the engaged clutch 66 to the ring gear 50. Third speed ratio is achieved by engaging both clutches 66 and 68 simultaneously and releasing both brake bands.

Reverse drive is achieved by engaging clutch 68 and brake band 62.

During operation in the second speed ratio, about two thirds of the torque is distributed mechanically and the balance is distributed through the converter hydrokinetically. During direct drive operation most of the torque is distributed mechanically and only about 7 percent is distributed hydrokinetically.

The gearing for the split torque unit may be located within the impeller housing as taught by U.S. Pat. No. 4,014,223.

Shown in FIG. 2 is an alternate gear system for use with a split torque gear unit and a converter of the kind shown in FIG. 1. For purposes of a description of FIG. 2, the elements of the FIG. 2 construction that are common to the FIG. 1 construction have been designated by similar reference characters in both Figures although prime notations are added to FIG. 2.

The gearing of FIG. 2 is a compound gear system that is distinct from the simple planetary gear system of FIG. 1. The gear system of FIG. 2 comprises a ring gear 100, a small sun gear 102, a larger sun gear 104 and meshing planet pinions 106 and 108. The pinions engage each other, and the pinion 106 engages also sun gear 102. Pinion 108 engages both ring gear 100 and sun gear 104. The pinions 106 and 108 are journalled rotatably on a common carrier 110.

Ring gear 100 is connected to a brake drum about which is positioned brake band 112. Sun gear 104 is connected to a separate brake drum about which is positioned brake band 114.

In FIG. 2A the clutch-and-brake engagement and release pattern that is followed to establish the various drive ratios is indicated. Brake band 112 is applied to establish reverse drive ratio as torque is distributed to the overrunning clutch 70' to the sun gear 102. Carrier 110 and output shaft 12' are driven in a reverse direction; and if coast braking is desired in the reverse drive range, clutch 68' can be applied.

Opertion in the low speed forward drive range is effected by engaging brake 114 thus causing sun gear 104 to act as a torque reaction point. Driving torque is then distributed to the sun gear 102 through either the overrunning clutch 70' or the friction clutch 68' depending upon whether continuous operation in the manual-low range is desired and depending upon whether coast braking is desired.

A ratio change to the intermediate ratio is effected by disengaging the clutch 68' and engaging clutch 66' while brake band 114 remains applied.

Direct drive is effected by engaging both clutches 66' and 68' while the brakes are released.

Although a stepped diameter pinion 106 is shown in FIG. 2, it would be possible to employ a single diameter pinion 106 if a change in the torque ratios indicated in FIG. 2A is desired. If a stepped pinion diameter is used as shown in FIG. 2, the input sun gear $S_2$ can be made with a larger diameter, which reduces the tooth stresses for any given input torque.

In both of the embodiments described in this specification, turbine torque is distributed to the left hand side of the split torque unit and output torque is taken from the other side. When the gearing, the turbine and the associated shafts are arranged in this fashion, torque output taken from the compound carrier of the split torque unit 30' and 30 is distributed to the central shaft 42 or 42', thus simplifying the gear set and making it possible to reduce to a minimum the overall dimensions and to make it easier to assemble the transmission in an automotive vehicle power train.

Having described a preferred embodiment of our invention, what we claim and desire to secure by U.S. Letters Patents is:

1. A hydrokinetic split torque transmission mechanism comprising a torque converter and a split torque gear unit;
    said converter comprising an impeller, a turbine and a reactor situated in a torus circuit, said impeller having an impeller shell enclosing said turbine and said reactor, a torque input shaft connected to said impeller shell;
    a split torque gear unit in said impeller shell comprising a ring gear, a sun gear and two planet gear sets, the planet gears of one set meshing with said ring gear and the planet gears of the other set meshing with said sun gear, said planet gears being journalled rotatably in engagement with each other on a common carrier;
    a driving connection between said turbine and said common carrier, a first torque delivery shaft centrally located in said converter connected directly to said common carrier, a torque delivery sleeve shaft surrounding said first shaft connected directly to said ring gear;
    multiple ratio gearing comprising multiple sun gears, ring gears and planet pinions journalled on a pinion carrier, one member of said multiple ratio gearing being adapted to be connected to a driven member;
    first clutch means for connecting a first input member of said multiple ratio gearing to said sleeve shaft and second clutch means for connecting a second torque input member of said multiple ratio gearing to said first shaft.

2. The combination as set forth in claim 1 wherein said driving connection between said turbine and the common carrier of said split torque gear unit is situated on one side of said split torque gear unit proximate to said torque input shaft and said first shaft is connected to said common carrier on the side of said split torque gear unit remote from said torque input shaft.

3. The combination as set forth in claim 1 wherein:
    said multiple ratio gearing comprises two simple planetary gear units each having a sun gear, a ring gear, a planet pinion set and a common carrier journalling each pinion set;
    said driven member being connected to said common carrier of said multiple ratio gearing, the sun gear of a first of said planetary gear units being connected to the ring gear of a second of said planetary gear units;
    said first clutch means being adapted to connect said sleeve shaft to the ring gear of said first gear unit and said second clutch means being adapted to connect the sun gear of said second planetary gear unit to said first shaft, and selectively engageable brake means for separately braking the ring gear of said first planetary gear unit and the ring gear of said second planetary gear unit, respectively.

4. The combination as set forth in claim 2 wherein:
    said multiple ratio gearing comprises two simple planetary gear units each having a sun gear, a ring gear, a planet pinion set and a common carrier journalling each pinion set;
    said driven member being connected to said common carrier of said multiple ratio gearing, the sun gear of a first of said planetary gear units being connected to the ring gear of a second of said planetary gear units;
    said first clutch means being adapted to connect said sleeve shaft to the ring gear of said first planetary gear unit and said second clutch means being adapted to connect the sun gear of said second planetary gear unit to said first shaft, and selectively engageable brake means for separately braking the ring gear of said first planetary gear unit and the ring gear of said second planetary gear unit, respectively.

5. The combination as set forth in claim 1 wherein:

said multiple ratio gearing comprises a compound planetary gear set having two sun gears, a single ring gear and two planet sets, said planet sets engaging each other and being carried on a common carrier that is adapted to be connected to said driven member, one planet set being in mesh with a first of said sun gears and the other planet set being engaged with a second of said sun gears and said ring gear;

and selectively engageable independent brake means for braking respectively said ring gear and said second sun gear.

6. The combinatijon as set forth in claim 2 wherein:

said multiple ratio gearing comprises a compound planetary gear set having two sun gears, a single ring gear and two planet sets, said planet sets engaging each other and being carried on a common carrier that is adapted to be connected to said driven member, one planet set being in mesh with a first of said sun gears and the other planet set being engaged with a second of said sun gears and said ring gear;

and selectively engageable independent brake means for braking respectively said ring gear and said second sun gear.

* * * * *